United States Patent [19]

Amjad

[11] Patent Number: 4,563,284

[45] Date of Patent: Jan. 7, 1986

[54] INHIBITION OF SALT PRECIPITATION IN AQUEOUS SYSTEMS

[75] Inventor: Zahid Amjad, Avon Lake, Ohio

[73] Assignee: The B. F. Goodrich Company, Akron, Ohio

[21] Appl. No.: 638,154

[22] Filed: Aug. 6, 1984

[51] Int. Cl.$^4$ .............................................. C02F 5/14

[52] U.S. Cl. ...................................... 210/699; 203/7; 252/8.55 B; 252/180

[58] Field of Search .................... 203/7; 210/638, 639, 210/698–701; 252/180, 181, 8.55 B; 426/271, 580, 599; 127/61

[56] References Cited

U.S. PATENT DOCUMENTS

| | | | |
|---|---|---|---|
| 2,847,308 | 8/1958 | Bersworth | 426/271 |
| 3,186,849 | 6/1965 | Silverman | 426/271 |
| 3,890,228 | 6/1975 | Hwa et al. | 210/699 |
| 3,959,168 | 5/1976 | Germscheid et al. | 210/700 |
| 4,046,707 | 9/1977 | Smith et al. | 210/699 |
| 4,209,398 | 6/1980 | Ii et al. | 422/15 |
| 4,372,870 | 2/1983 | Snyder et al. | 210/699 |
| 4,386,005 | 5/1983 | Kapiloff et al. | 210/699 |
| 4,389,324 | 6/1983 | Keller | 210/701 |
| 4,452,703 | 6/1984 | Ralston et al. | 210/698 |

FOREIGN PATENT DOCUMENTS

| | | |
|---|---|---|
| 1081604 | 7/1980 | Canada . |
| 1117395 | 2/1982 | Canada . |

*Primary Examiner*—Peter Hruskoci
*Attorney, Agent, or Firm*—George A. Kap; Alan A. Csontos

[57] ABSTRACT

This invention is directed to the method of dispersing inorganic matter and to scale inhibition in an aqueous system by addition thereto of an effective amount to obtain synergistic threshold inhibition of a phosphonocarboxylic acid and a polymeric phosphinocarboxylic acid, the phosphonocarboxylic acid being a phosphonoalkane carboxylic acid containing preferably two phosphono groups, 2 to 4 carbon atoms in the alkane hydrocarbon group, and three carboxylic acid groups; and the polymeric phosphinocarboxylic acid contains features of both phosphonates and polyacrylates.

8 Claims, No Drawings

INHIBITION OF SALT PRECIPITATION IN AQUEOUS SYSTEMS

BACKGROUND OF THE INVENTION

This invention generally relates to the inhibition of scale formation and deposition in aqueous systems by adding thereto an effective threshold amount of a phosphonocarboxylic acid and a polymeric phosphinocarboxylic acid that contains features of both phosphonates and polyacrylates. In a preferred embodiment, the addition of the active materials to an aqueous system results in synergistic results with respect to obtaining unexpectedly high levels of scale inhibition. Specific applications contemplated herein are aqueous systems used in recirculating cooling towers, desalination, oil field applications particularly in secondary oil recovery operations, flash distillation, as well as in aqueous systems such as sugar solutions.

The materials disclosed herein as being suitable in inhibiting formation and deposition of scale and particulate matter, are particularly suitable for use in aqueous systems where calcium sulfate scaling is a major problem, as in desalination, specifically reverse osmosis and flash distillation. Other suitable applications include the petroleum industry, pulp digesters, phosphoric acid production, and sugar evaporators.

Scale-forming salts can be prevented from precipitating by complexing the cations with chelating or sequestering agents so that the solubility of the reaction products is not exceeded. Generally, this requires stoichiometric amounts of chelating or sequestering agent with respect to the scale-forming cation, which amounts are not always desirable or economical.

More than 25 years ago, it was discovered that certain inorganic polyphosphates would prevent such precipitation when added in amounts far less than the concentrations needed for sequestering or chelating. When a precipitation inhibitor is present in a potentially scale-forming system at a markedly lower concentration than that required for sequestering the scale-forming cation, it is said to be present in a "threshold" amount. Threshold inhibition describes the phenomenon whereby a substoichiometric amount of a scale inhibitor can stabilize a solution from precipitation which solution can contain hundreds or thousands of parts of scale-forming ions. Threshold inhibition generally takes place under conditions where a few, i.e, 1 to 10 ppm, of a polymeric inhibitor will stabilize in solution from about 100 to several thousand ppm of a scale-forming mineral.

As already discussed above, whereas threshold inhibition occurs at substoichiometric ratios of inhibitor to scale-forming cation, sequestration requires a stoichiometric ratio of sequestrant to scale-forming cation to maintain that cation in solution. Generally, sequestering takes place at a weight ratio of threshold active compound to scale-forming cation components of greater than about ten to one, depending on the anion components in the water. Threshold inhibition, however, generally takes place at a weight ratio of threshold active compound to scale forming cation components of less than about 0.5 to 1.0. For example, a calcium sulfate solution containing 1820 ppm of calcium ions and 4440 ppm of sulfate ions is thermodynamically unstable. Unless a scale inhibitor is added, precipitation in such a system will take place within about one-half hour. To control precipitation of calcium sulfate from the supersaturated solution, the following two approaches are available:

(a) to complex or sequester calcium ions with a complexing agent such as ethylenediamine tetraacetic acid (EDTA) or nitrilotriacetic acid (NTA). Amount of each required to completely complex calcium ions would be stoichiometric, i.e, 1:1 ratio of Ca:EDTA or about 13300 ppm of EDTA to sequester 1820 ppm of calcium;

(b) on a threshold basis, one would need a substoichiometric amount of about 2 ppm of a polyacrylate to completely inhibit precipitation of calcium sulfate.

Therefore, on the basis of the above discussion, the tremendous difference between sequestration and threshold inhibition reflects the obvious advantages of the latter over the former.

Canadian Pat. No. 1,081,604 to Nass et al describes scale control in recirculating cooling towers operating with zero blowdown which is achieved by maintaining a certain level of a scale inhibitor in the cooling tower water and softening and returning a sidestream to the cooling tower water. At middle of p. 9 of this patent, a list of preferred scale inhibiting materials is given which includes phosphono tri-carboxylic acids as well as amino phosphonic acids, diphosphonic acids, polyphosphoric acids, polyol phosphate esters, amino phosphonates, maleic anhydride copolymers, and acrylic polymers. Although this patent is not specific in stating the particular mineral material against which the noted scale inhibitors are effective, it appears that the objective is the control of calcium carbonate scaling. This conclusion is based, inter alia, on statements appearing at bottom of p. 8 and top of p. 9 of the patent.

Canadian Pat. No. 1,117,395 to Dubin et al, pertains to scale prevention in industrial cooling waters using a phosphonocarboxylic acid and a polymer of acrylic acid. This patent is expressly directed to a composition for inhibiting the deposition of scale and sludge on the heat transfer surfaces of cooling water systems. This patent discusses scaling problems in recirculating cooling tower water systems where calcium carbonate scaling is the primary problem. Based on the disclosure and the data presented, this patent shows effectiveness of the composition against calcium carbonate scaling and there is no reason to assume that such a composition would be effective in applications where calcium sulfate scaling is the dominant problem. Furthermore, there is evidence to support the conclusion that effectiveness against calcium carbonate scaling implies relative ineffectiveness against calcium sulfate scaling.

U.S. Pat. No. 4,046,707 to Smith et al discloses the use of the polymeric phosphinocarboxylic acids that contain features of both the phosphonates and the polyacrylates in aqueous systems for inhibiting precipitation of scale-forming salts particularly calcium sulfate, magnesium hydroxide, and calcium carbonate salts. This patent, in its entirety, is incorporated by reference as if fully set forth herein.

A related copending patent application entitled "Calcium Sulfate Inhibition" filed for inventor Zahid Amjad claims the method of calcium sulfate scale inhibition in certain aqueous systems by the addition to an aqueous system a polyacrylic acid or its salt and a phosphonocarboxylic acid.

SUMMARY OF THE INVENTION

This invention is directed to the method for inhibiting formation and deposition of scale-forming salts by adding thereto an effective threshold amount of a phosphonocarboxylic acid and a telomeric phosphinocarboxylic acid that contains features of both phosphonates and polyacrylates. Addition of the active materials can be made together or separately. The combination of the active materials produces synergistic results in terms of threshold inhibition of scale formation.

DETAILED DESCRIPTION OF THE INVENTION

This invention relates to a method for dispersing and maintaining dispersed particulate or inorganic matter, particularly iron oxide and clay, in an aqueous medium containing such matter and/or for controlling the deposition of scale-imparting precipitates on surfaces of equipment used in recirculating or the once-through water systems containing such precipitates, or precipitate-forming ions, under conditions which form the precipitates. The method comprises the step of adding to preferably neutral or alkaline water a small amount, i.e., in the range from about 1 part per million (ppm) to about 200 ppm, of materials defined herein to inhibit deposition of the precipitates such as those selected from calcium phosphate, calcium carbonate, calcium sulfate, barium sulfate, magnesium phosphate, magnesium hydroxide, calcium silicate, magnesium silicate, iron oxide, zinc hydroxide, zinc phosphate, calcium fluoride, calcium oxalate, and mixtures thereof.

The invention described herein is directed to threshold inhibition in typical cooling water process streams However, other process water streams which contain concentrations of ions far in excess of typical cooling water streams may also be effectively treated for scale inhibition with the copolymers of our invention in concentrations from about 1 ppm to about 200 ppm, and in some instances as high as 500 ppm, where the cost is justified. Such other process water streams include brine solutions such as are processed in desalination plants, particularly in the multiple evaporators thereof; and in brackish waters containing a high concentration of salts such as are typically encountered in membrane devices for reverse osmosis processes. Still other process water uses are in various oil field applications for scale inhibition in conduits circulating saline and oily water, where the water is present in a major amount by weight, most particularly in secondary oil recovery operations.

It has also been found that scale inhibiting materials of our invention appear to be non-toxic to humans when used in aqueous systems such as animal milk and in fruit juices in a small amount in the range from about 0.05 to about 10 ppm, more preferably from about 0.1 to about 1 ppm. Thus, milk containing the herein-disclosed materials in an amount sufficient for inhibiting the deposition of scale on the surfaces of pasteurizing equipment is found highly suitable for minimizing maintenance and shut-downs in milk processing plants. In an analogous manner, our materials may be used to inhibit the deposition of scale inside equipment used to process the sucrose and other sugar-containing juice extracted from various fruits, particularly the juice extracted by crushing and pressing sugar cane and sugar beets.

It does not appear to be well known as to what particular scales are found in milk evaporators and in fruit juices, although they are referred to as "milk stones". In the case of sugar refining, however, it is well documented that calcium sulfate is an important scale found in sugar syrup evaporators.

In the context of the invention described herein, of special significance is the use of the scale inhibiting materials disclosed herein in aqueous systems where calcium sulfate scaling is a major consideration. Particular applications contemplated herein in the context of preferred embodiments include reverse osmosis and flash distillation, oil field applications, pulp digesters, phosphoric acid production, sugar evaporators, and the like.

The polymeric phosphinocarboxylic acids, including salts thereof and derivatives thereof, can be prepared by reacting an acrylic acid with a hypophosphorous acid or a derivative thereof generally represented as follows:

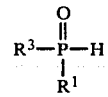

where $R^1$ is group OX where X is hydrogen, or a straight or branched alkyl radical containing 1 to 4 carbon atoms; and $R^3$ is hydrogen, a straight or branched alkyl group of 1 to 18 carbon atoms, a cycloalkyl group of 5 to 12 carbon atoms, a phenyl group, a benzyl group, or an —OX group where X is hydrogen or a straight or branched alkyl group of 1 to 4 carbon atoms. A salt of the hypophosphorous acid can also be employed, as already noted, wherein the acidic hydrogens are partially or totally replaced by cations derived from salt forming bases. The phosphonocarboxylic acids referred to herein include phosphonoalkane carboxylic acids that contain at least one phosphono group

at least two carboxylic groups, and at least two carbon atoms in the alkane hydrocarbon group. The relative amount of the active materials is in the range of about 0.1 to 5, preferably 0.2 to 3, weight parts of the polymeric phosphinocarboxylic acid, its salt or its derivative, per 1 weight part of the phosphonocarboxylic acid. Amount of the active materials added to industrial aqueous systems can vary in the range of about 1 to 200 ppm, preferably 1 to 10 ppm, however, in certain food applications, amount of the active materials will be in the range of about 0.05 to 10 ppm, preferably about 0.1 to 1 ppm.

The synergistic results obtained by adding both a phosphonocarboxylic acid and a polymeric phosphinocarboxylic acid are dramatic. For instance, 1.50 ppm of the phosphonocarboxylic acid alone yielded calcium sulfate threshold inhibition of only 22% whereas 1.50 ppm of the polymeric phosphinocarboxylic acid alone yielded calcium sulfate threshold inhibition of only 25%. However, when 1.00 ppm of the polymeric phosphinocarboxylic acid was added to an aqueous system together with 0.5 ppm of the phosphonocarboxylic acid, threshold inhibition for calcium sulfate scale was an unexpected 99%!

The polymeric phosphinocarboxylic acids, salts and derivatives thereof, can be prepared by reacting an acrylic acid with a hypophosphorous acid, or its derivative, these materials being defined by the following structural formulas I and II:

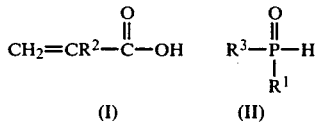 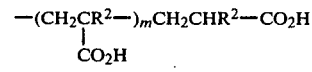

where $R^1$ is —OX group where X is hydrogen or a straight or a branched alkyl group of 1 to 4 carbon atoms; $R^2$ is hydrogen, methyl or ethyl group; and $R^3$ is hydrogen, straight or branched alkyl group of 1 to 18 carbon atoms, a cycloalkyl group of 5 to 12 carbon atoms, a phenyl group, a benzyl group, or the —OX group where X is hydrogen or a straight or a branched alkyl group of 1 to 4 carbon atoms. A salt of compound II can be employed, in which case, the acidic hydrogens are partially or completely replaced by alkali metal ions, ammonium ions, or quaternized amine groups.

The reaction of compounds I and II is carried out in a solvent that is inert under the reaction conditions and in the presence of a reaction initiator. Suitable reaction solvents include water, aqueous ethanol and dioxan and suitable initiators include materials that decompose under reaction conditions to yield free radicals. Examples of such free radical initiators include bisazoisobutyro nitrile; organic peroxides such as benzoyl peroxide, methyl ethyl ketone peroxide, ditertiary butyl peroxide, and monobutyl hydroperoxide; and oxidizing agents such as hydrogen peroxide, sodium perborate, and sodium persulfate.

The reaction products of compounds I and II are obtained as solutions that can be subjected to partial or complete evaporation under reduced pressure. The unrefined reaction products can be used as the telomeric products, as described herein, or they can be purified in a known manner. Examination of the reaction products described herein by means of nuclear magnetic resonance has shown that in addition to the unreacted compounds I and II, and polymerized compounds II, there is also the reaction product of compounds I and II.

Reaction products of compounds I and II, defined above, are telomeric or polymeric phosphinocarboxylic acids that have features of both the phosphonates and polyacrylates. The polymeric phosphinocarboxylic acids suitable herein are defined by the following structural formula III:

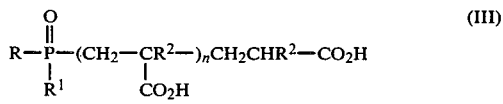

where R is hydrogen, a straight or branched alkyl group of 1 to 18, but preferably 1 to 10 carbon atoms, a cycloalkyl group of 5 to 12 carbon atoms, an aryl group, an aralkyl group, an —OX group where X is hydrogen or a straight or a branched alkyl group of 1 to 4 carbon atoms, or the following group:

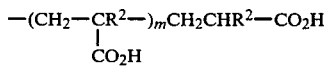

where $R^2$ is hydrogen, methyl, or ethyl group and where the sum of m and n is up to about 100; and where $R^1$ is an —OX group where X is hydrogen or a straight or a branched alkyl group of 1 to 4 carbon atoms.

In a preferred embodiment R represents the following group:

—(CH$_2$CR$^2$—)$_m$CH$_2$CHR$^2$—CO$_2$H
|
CO$_2$H where $R^2$ is hydrogen and the sum of m and n is less than 60 and is more preferably in the range of about 5 to 20; and $R^1$ is a hydroxyl group.

Suitable herein are reaction products defined by formula III, above, as well as salts and derivatives thereof. Examples of the bases with which reaction products of formula III can be reacted to form partial or complete salts thereof are the hydroxides and carbonates of sodium, potassium, and ammonia, as well as organic bases such as primary, secondary and tertiary alkyl and substituted alkyl amines in which total number of carbon atoms does not exceed 12, such as triethanolamine.

Polymeric phosphinocarboxylic acids defined by formula III, above, can be prepared in the manner described in U.S. Pat. No. 2,957,931, which patent is incorporated in its entirety as if fully set forth herein.

The telomeric or polymeric phosphinocarboxylic acids described herein are commercially available materials. Ciba-Geigy offers polymeric phosphinocarboxylic acid under the tradename "Belsperse 161" that is defined as containing both phosphonate and polyacrylate groups. This material is said to be useful as a scale control agent for calcium carbonate, calcium sulfate, and barium sulfate and is additionally alleged as being effective in dispersing iron oxides, calcium phosphate, and clay. This product is said to have been designed for use in water treatment formulations for cooling towers, boilers, pulp and paper, and gas scrubber applications. This product is sold as a 46–52% aqueous solution having neat pH of 3.5, viscosity at 25° C. of 380–900 cps, phosphorous content as P of 0.86%, and is stated to be miscible with water, ethylene glycol, and with 50% caustic solution. The product is alleged to be unaffected by chlorine under normal use conditions, is compatible with most common water treatment chemicals, has excellent hydrolytic stability, and can be formulated in strong caustic solutions.

The other essential material used in scale inhibition, as described herein, is the phosphonocarboxylic acid defined by the following formulas IV and V:

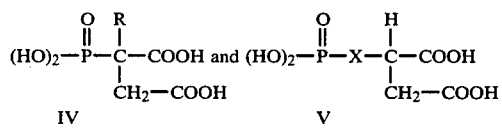

where R is hydrogen, alkyl, alkenyl, or alkinyl radical having 1 to 4 carbon atoms, an aryl, cycloalkyl, or aralkyl radical, or the radical selected from the following:

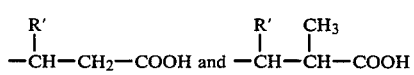

where R' is hydrogen, alkyl radical of 1 to 4 carbon atoms, or a carboxyl radical; and X is selected from the following:

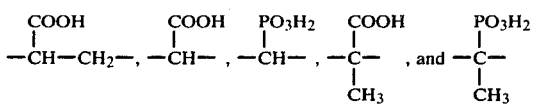

where the —PO₃H₂ group is the phosphono group

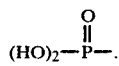

Illustrative of specific phosphonocarboxylic acids include
α-methylphosphonosuccinic acid,
phosphonosuccinic acid,
1-phosphonopropane-2,3-dicarboxylic acid,
2-phosphonobutane-1,2,4-tricarboxylic acid,
α-allyl-phosphonosuccinic acid,
α-p-chlorophenylphosphonosuccinic acid,
α-propargyl-phosphonosuccinic acid,
α-benzyl-phosphonosuccinic acid,
α-cyclohexyl-phosphonosuccinic acid,
2-phosphono-3-(α-methyl-carboxymethyl)-hexane-1,2,4 tricarboxylic acid,
2,2-diphosphono-butane-2,4-dicarboxylic acid, and the like. The preferred phosphonocarboxylic acid is 2-phosphonobutane-1,2,4-tricarboxylic acid.

The phosphonocarboxylic acids are also referred to herein as phosphonoalkane carboxylic acids that contain at least one and preferably one or two phosphono groups

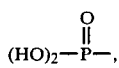

at least two and preferably two or three carboxylic acid groups, with the main hydrocarbon chain containing at least 2 and preferably 2 to 6 carbon atoms with substituents on the chain selected from alkyl, alkenyl, alkinyl, aryl, arylalkyl, alkaryl, and carboxylated and halogenated versions thereof. These acids and preparation thereof are described in U.S. Pat. Nos. 3,886,204, 3,886,205 and 4,026,815, all of which are incorporated herein by reference as if fully set forth herein.

The active materials described herein in connection with threshold inhibition of salt-forming scales can be used in combination with other conventional additives wherever appropriate. Examples of some of the conventional additives include precipitating agents, oxygen scavengers, sequestering agents, corrosion inhibitors, antifoaming agents, and the like.

The scale inhibiting compositions described herein were used to treat water which contained calcium ions and sulfate ions. The threshhold inhibitions test for calcium sulfate inhibition were carried out as follows: supersaturated solutions of 6,220 ppm calcium sulfate at pH of 7.0 and containing 0 to 3 ppm of inhibitor were prepared. Solutions were then stored in capped 4-ounce jars and placed in a 66° C. oven without agitation. After 24 hours, solutions were filtered through a 0.22 micrometer filter paper and calcium analyzed by EDTA titrations.

The percent threshold inhibition (TI) attained for each experiment is obtained using the following formula, shown in this case for calcium sulfate:

$$\% \ TI = \frac{(Ca) \ exp - (Ca) \ final}{(Ca) \ initial - (Ca) \ final} \times 100$$

where
(Ca) exp=concentration of calcium ions in the filtrate in presence of the polymer at time 24 hours
(Ca) final=concentration of calcium ions in filtrate in absence of the polymer at time 24 hours
(Ca) initial=concentration of calcium ions at time zero.

The invention described herein is illustrated by the examples set forth below with respect to the particular materials used in scale inhibition and with respect to the particular mineral salt sought to be inhibited in an aqueous system.

EXAMPLE

This example demonstrates threshold inhibition by the addition to an aqueous system at least one phosphonobutane carboxylic acid alone, a polymeric phosphinocarboxylic acid alone, and combinations of the two active materials together, on calcium sulfate scale. The tests were carried out, as described above, for a period of 24 hours to determine percent threshold inhibition (TI) of calcium sulfate, results of which are given in Table I, below, where the phosphono loweralkane carboxylic acid (PCA) was 2-phosphonobutane-1,2,4-tricarboxylic acid and the polymeric phosphinocarboxylic acid (PPCA) was Ciba-Geigy's Belsperse 161:

TABLE I

| Test No. | PCA, ppm | PPCA, ppm | % TI |
|---|---|---|---|
| 1 | 0.50 | 0 | 5 |
| 2 | 1.00 | 0 | 14 |
| 3 | 1.50 | 0 | 22 |
| 4 | 2.50 | 0 | 68 |
| 5 | 0 | 1.00 | 13 |
| 6 | 0 | 1.50 | 25 |
| 7 | 0 | 2.0 | 47 |
| 8 | 1.00 | 0.50 | 99 |

The data in Table I, above, clearly demonstrates ineffectiveness of the phosphonoalkane carboxylic acid when used alone to inhibit precipitation and/or crystallization of calcium sulfate. At 0.50 ppm of the phosphonoalkane carboxylic acid alone, threshold inhibition of calcium sulfate was only 5% that increased to 22% at 1.50 ppm level and to 68% at 2.50 ppm level. Likewise, the data in Table I demonstrates ineffectiveness of the polymeric phosphinocarboxylic acid when used alone. At a level of 1.00 ppm of the polymeric phosphinocarboxylic acid by itself, threshold inhibition was only 13% that increased to 47% at 2.00 ppm level. The synergism of the two active materials is dramatically illustrated by the data in Table I. When 1.00 ppm of the phosphonoalkane carboxylic acid was used together with 0.50 ppm of the polymeric phosphinocarboxylic acid, threshold inhibition of an incredible 99% was attained! This is about five times the threshold inhibition attained by the phosphonoalkane carboxylic acid when used alone at 1.50 ppm level and about four times the threshold inhbition observed with the polymeric phosphinocarboxylic acid when used alone at 1.50 ppm level.

I claim:

1. Method for dispersing inorganic matter and for inhibiting precipitation of scale, including calcium sulfate scale, in an aqueous system containing calcium sulfate comprising the step of adding to said aqueous system about 0.05 to 500 ppm of a first active material selected from at least one phosphonocarboxylic acid and a second active material selected from at least one polymeric phosphinocarboxylic acid or a salt or a derivative thereof; said phosphonocarboxylic acid is selected from the group defined by the following two formulas:

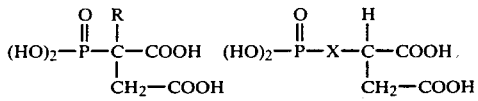

where R is selected from hydrogen; alkyl, alkenyl, and alkinyl radicals having 1 to 4 carbon atoms; aryl, cycloalkyl, and aralkyl radicals; and radicals selected from the following:

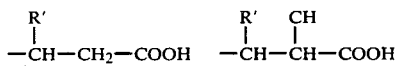

where R' is selected from hydrogen, alkyl radicals of 1 to 4 carbon atoms, and carboxyl radicals, and where X is selected from the following

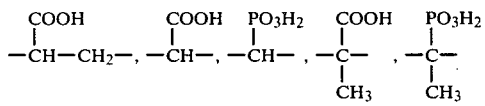

where the —$PO_3H_2$ moiety is the phosphono group

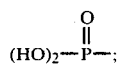

wherein said polymeric phosphinocarboxylic acid is defined as follows:

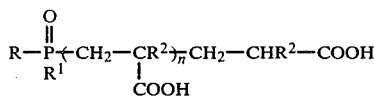

where R is selected from hydrogen, straight or branched alkyl groups of 1 to 18 carbon atoms, cycloalkyl groups of 5 to 12 carbon atoms, —OX groups where X is selected from hydrogen, and straight or branched alkyl groups of 1 to 4 carbon atoms, and groups defined as follows:

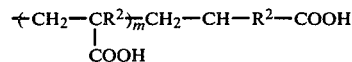

where $R^2$ is selected from hydrogen, methyl and ethyl groups, and where the sum of m and n is up to about 100; where $R^1$ is selected from —OX groups where X is selected from hydrogen, and straight and branched alkyl groups of 1 to 4 carbon atoms; and wherein the relative ratio of the active materials is in the range of about 0.1 to 5 weight parts of said polymeric phosphinocarboxylic acid per 1 weight part of said phosphonocarboxylic acid.

2. Method of claim 1 wherein said aqueous system is selected from process water used in a steam generating system, a recirculating water system, a gas scrubbing system, a desalination water system, and a crude petroleum recovery system.

3. Method of claim 1 wherein said phosphonocarboxylic acid is selected from phosphonoalkane carboxylic acids containing 1 to 2 phosphono groups, 2 to 3 carboxylic acid groups, and 2 to 6 carbon atoms in the alkane hydrocarbon moiety.

4. Method of claim 1 wherein said second active material is selected from polymeric phosphinocarboxylic acids and water-soluble salts thereof, and wherein in the definition of said polymeric phosphinocarboxylic acid R is selected from the groups defined as follows:

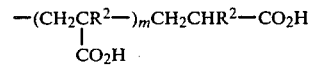

where $R^2$ is hydrogen, the sum of m and n is in the range of about 5 to 20, and $R^1$ is a hydroxyl group.

5. Method of claim 1 wherein said phosphonocarboxylic acid is 2-phosphonobutane-1,2,4-tricarboxylic acid and said polymeric acid has $R^2$ that is hydrogen and the sum of m and n that is in the range of about 5 to 20.

6. Method of claim 1 wherein said aqueous system is neutral or alkaline.

7. Method of claim 1 for inhibiting precipitation of calcium sulfate scale wherein the combined amount of the active materials is 0.1 to 200 ppm and wherein the relative ratio of the active materials is in the range of about 0.2 to 3 weight parts of said phosphonocarboxylic acid per 1 weight part of said polymeric phosphinocarboxylic acid.

8. Method of claim 7 wherein the combined amount of the active materials is 1 to 10 ppm.

* * * * *